United States Patent
Koch et al.

(10) Patent No.: US 12,253,419 B2
(45) Date of Patent: Mar. 18, 2025

(54) THERMOMETER

(71) Applicant: Endress+Hauser Wetzer GmbH+Co. KG, Nesselwang (DE)

(72) Inventors: Daniel Koch, Oy-Mittelberg (DE); Marc Schalles, Erfurt (DE); Harald Bründl, Schwabhausen (DE); Stephan Wiedemann, Bihlerdorf (DE); Peter Wiedemann, Weitnau (DE); Torsten Iselt, Kempten (DE); Christian Peuker, Immenstadt (DE); Pavo Vrdoljak, Nesselwang (DE); Georg Wolf, Marktoberdorf (DE); Christian Kallweit, Memmingen (DE); Markus Mornhinweg, Dießen (DE); Alfred Umkehrer, Hopferau (DE)

(73) Assignee: ENDRESS+HAUSER WETZER GMBH+CO. KG, Nesselwang (DE)

( * ) Notice: Subject to any disclaimer, the term of this patent is extended or adjusted under 35 U.S.C. 154(b) by 309 days.

(21) Appl. No.: 17/642,440

(22) PCT Filed: Aug. 20, 2020

(86) PCT No.: PCT/EP2020/073391
§ 371 (c)(1),
(2) Date: Mar. 11, 2022

(87) PCT Pub. No.: WO2021/047883
PCT Pub. Date: Mar. 18, 2021

(65) Prior Publication Data
US 2022/0341794 A1      Oct. 27, 2022

(30) Foreign Application Priority Data
Sep. 12, 2019   (DE) .................... 10 2019 124 606.7

(51) Int. Cl.
*G01K 13/02* (2021.01)
*G01K 1/143* (2021.01)
(Continued)

(52) U.S. Cl.
CPC ............. *G01K 13/02* (2013.01); *G01K 1/143* (2013.01); *G01K 1/16* (2013.01); *G01K 7/02* (2013.01)

(58) Field of Classification Search
CPC .......... G01K 13/02; G01K 1/143; G01K 1/16; G01K 7/02
See application file for complete search history.

(56) References Cited

U.S. PATENT DOCUMENTS 3,281,518 A * 10/1966 Stroud ..................... G01K 1/18
374/165
4,959,633 A *  9/1990 Kiraly ..................... G01K 7/22
374/E7.018

(Continued)

FOREIGN PATENT DOCUMENTS

CH          647867 A5      2/1985
CN       102338671 A  *   2/2012  ............... G01K 1/08
(Continued)

OTHER PUBLICATIONS

Translation of EP2093548A2 (Year: 2009).*

*Primary Examiner* — Mirellys Jagan
(74) *Attorney, Agent, or Firm* — Brannon Sowers & Cracraft PC

(57) ABSTRACT

The invention relates to an apparatus for determining and/or monitoring a temperature of a medium in a containment, comprising a measuring insert having a temperature sensor for registering temperature, a protective tube, in which the temperature sensor is arranged, and a heat conductive, (Continued)

formed piece, which is arranged in the protective tube and surrounds the measuring insert at least sectionally.

14 Claims, 3 Drawing Sheets

(51) Int. Cl.
  *G01K 1/16* (2006.01)
  *G01K 7/02* (2021.01)

(56) References Cited

U.S. PATENT DOCUMENTS

| | | |
|---|---|---|
| 5,709,475 A | 1/1998 | Stoor |
| 6,485,175 B1 | 11/2002 | Nimberger et al. |
| 2002/0041621 A1 | 4/2002 | Faries, Jr. et al. |
| 2014/0269820 A1 | 9/2014 | Perrault et al. |
| 2015/0068281 A1 | 3/2015 | Yon et al. |

FOREIGN PATENT DOCUMENTS

| | | | | |
|---|---|---|---|---|
| CN | 207197685 U | * | 4/2018 | ............... G01K 1/08 |
| CN | 108332874 A1 | | 7/2018 | |
| DE | 4030656 A1 | * | 4/1992 | |
| EP | 2093548 A2 | * | 8/2009 | ............... G01K 1/10 |
| JP | 2017015701 A | * | 1/2017 | ............... G01K 1/08 |

* cited by examiner

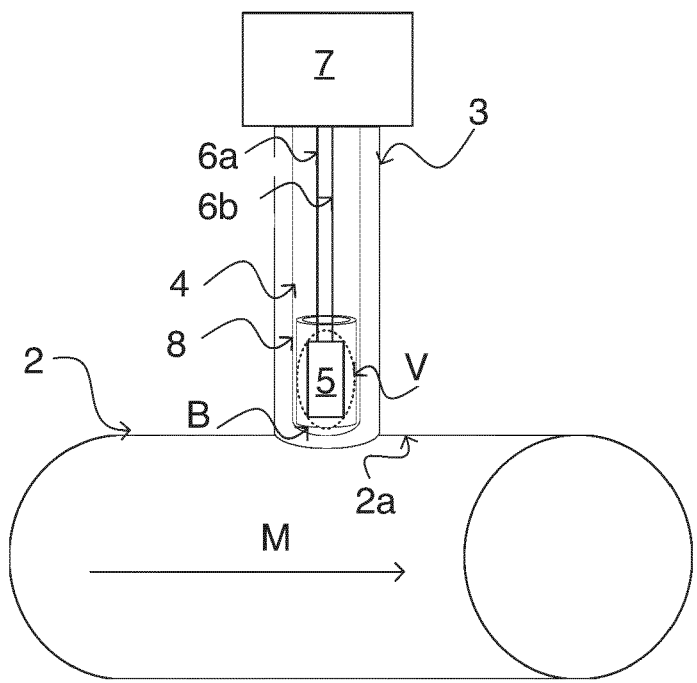
Fig. 3
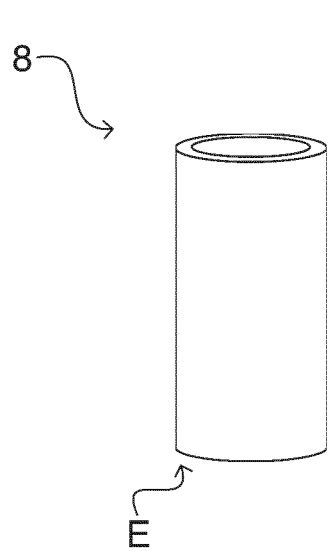 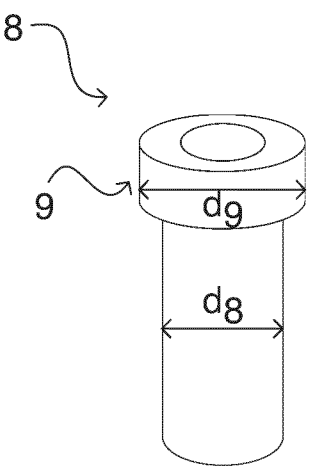 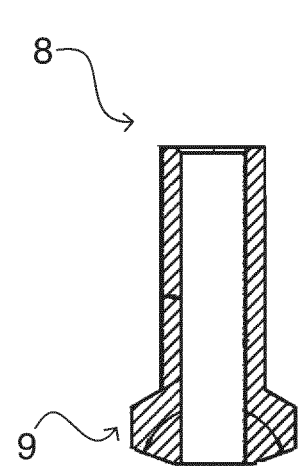
Fig. 4a  Fig. 4b  Fig. 4c

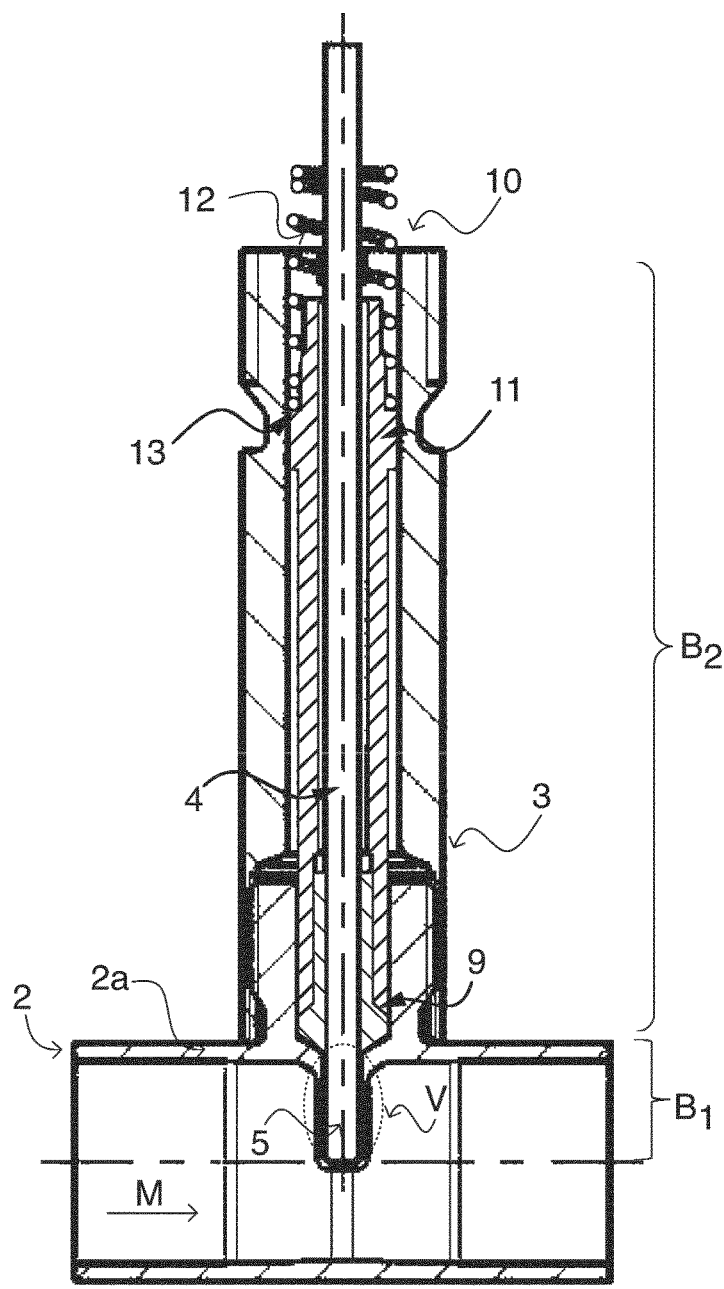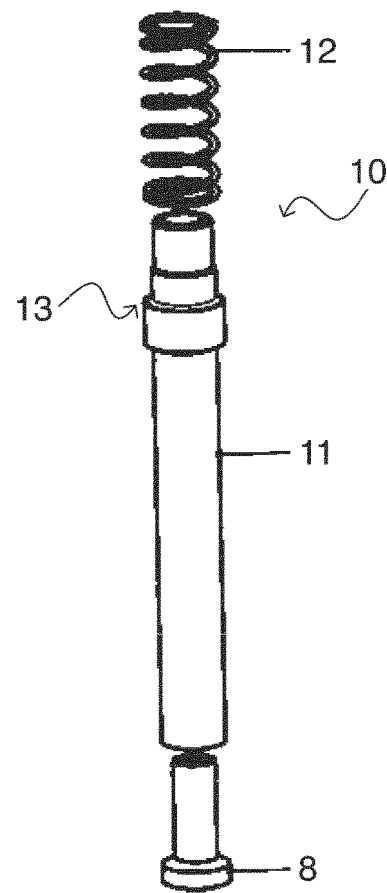
Fig. 5
Fig. 6

THERMOMETER

CROSS-REFERENCE TO RELATED APPLICATIONS

The present application is related to and claims the priority benefit of German Patent Application No. 10 2019 124 606.7, filed on Sep. 12, 2019, and International Patent Application No. PCT/EP2020/073391, filed on Aug. 20, 2020, the entire contents of which are incorporated herein by reference.

TECHNICAL FIELD

The invention relates to a thermometer for determining and/or monitoring temperature of a medium in automation technology, as well as to a method for producing an apparatus of the invention.

BACKGROUND

Thermometers are known in a wide variety of embodiments in the state of the art. Thus, there are thermometers, which for measuring temperature use the expansion of a liquid, a gas or a solid of known coefficient of thermal expansion, or such, which relate the electrical conductivity of a material or a variable derived therefrom to the temperature, such as, for example, the electrical resistance in the case of application of resistance elements or the thermoelectric effect in the case of thermocouples. In contrast, in the case of radiation thermometers, especially pyrometers, for determining the temperature of a substance, its heat radiation is utilized. The measuring principles of these measuring devices are described in a large number of publications.

In the case of a temperature sensor in the form of a resistance element, among others, so-called thin film- and thick film sensors as well as a so-called NTC thermistor are known. In the case of a thin film sensor, especially a Resistance Temperature Detector (RTD) sensor element is used, for example, one equipped with connection wires and applied on a substrate, wherein the rear face of the support substrate is, as a rule, metal coated. Used as sensor elements are so-called resistance elements, which are based, for example, on platinum elements and which are also commercially obtainable, among others, under the designations PT10, PT100, and PT1000.

In the case of temperature sensors in the form of thermocouples, in turn, the temperature is determined by a thermovoltage, which occurs between the unilaterally connected thermocouple wires of different materials. For temperature measurement, usually thermocouples of DIN standard IEC584 are applied as temperature detector, e.g. thermocouples of type K, J, N, S, R, B, T or E. However, also other material pairs, especially such having a measurable Seebeck effect, are possible.

The temperature sensors are frequently part of a measuring insert, which, for example, is introduced into an immersion body, or protective tube, entering into the medium. Similar embodiments of thermometers are, however, also known for noninvasive temperature measurement. In such case, the temperature sensor comes in contact with the medium via the wall of a containment, in which the medium is located, and is suitably secured to the wall of the containment.

For a reliable temperature determination, it is important that the temperature sensor and the medium are essentially in thermal equilibrium with one another, at least for a certain time required for registering the temperature. The time for a reaction of a thermometer to a temperature change is also referred to as the response time of the thermometer.

The accuracy of measurement of a thermometer depends, in such case, sensitively on the thermal contacts and the reigning heat conduction. Especially in such case, the heat flows between the medium, the containment, in which the medium is located, the components of the thermometer and the process environment play a deciding role. In the case of invasive temperature measurement by means of an immersion body, heat drain to the environment plays, for example, a rising role with declining length of the immersion body. Heat from the process moves via the protective tube not only to the temperature sensor, but also to the environment. In the case of noninvasive temperature measurement, the influence of this unwanted heat drain to the environment is even greater, since the temperature sensor is in such case not directly surrounded by the medium.

SUMMARY

Therefore, an object of the invention is to improve the accuracy of measurement of thermometers.

The object is achieved by the apparatus as defined in claim 1. The apparatus of the invention for determining and/or monitoring a temperature of a medium in a containment, especially a container or a pipeline, comprises a measuring insert having a temperature sensor for registering temperature and a protective tube, in which the temperature sensor is arranged. Moreover, the apparatus includes a heat conductive, formed piece, which is arranged in the protective tube and surrounds the measuring insert at least sectionally, especially in a process far region of the temperature sensor.

The formed piece serves for heat conduction from the process to the temperature sensor, and heat distribution within the thermometer. Especially, the formed piece serves to assure an essentially uniform temperature distribution in a predeterminable volume surrounding the temperature sensor. In this way, there occurs in the region of the temperature sensor advantageously a significantly reduced temperature gradient due to heat draining to the environment. A region surrounding the temperature sensor is essentially uniformly heated. In comparison with a heat conductive paste, the formed piece of the invention advantageously provides a reproducible, essentially time constant, thermal contact.

Depending on embodiment of the thermometer, the formed piece is so embodied that it at least partially surrounds the temperature sensor and is in thermal contact with at least one additional component of the thermometer, especially the protective tube. In such case, especially also a process far region surrounding the temperature sensor experiences reduced heat loss.

Advantageously, the formed piece of the invention can also be utilized for retrofitting existing thermometers.

In an advantageous embodiment, the formed piece is made of copper, silver, graphite, boron nitride, a steel, especially stainless steel, or an alloy containing at least one of these materials.

A preferred embodiment provides that the formed piece is at least sectionally tubular, especially cylindrical. In the tubular region, the formed piece is then arranged around the measuring insert in the protective tube and is thus located between the measuring insert and the protective tube.

Another preferred embodiment includes that the formed piece is pot shaped. The formed piece includes, thus, a tubular section and a floor. Such an embodiment is suited, for example, for the case of a noninvasive thermometer. Here, the measuring insert is located in the pot shaped, formed piece.

In another embodiment having a pot shaped, formed piece, the floor of the formed piece has a bore, as a result of which the measuring insert is guidable. Such an embodiment is, in turn, suited, for example, for the case of an invasive temperature determination. The floor is especially arranged at the process far side of the temperature sensor. The floor serves therewith, in principle, as a lid and limits a volume surrounding the temperature sensor from the environment. Such an embodiment, can, however, equally be implemented in connection with a noninvasive thermometer.

In an especially preferred embodiment of the invention, the formed piece has at least sectionally a geometry corresponding to a geometry of the protective tube and/or the measuring insert. Especially, the geometry of the formed piece is at least sectionally fitted to the geometry of the protective tube in the region, into which the formed piece is insertable in the protective tube and/or to the geometry of the measuring insert in the regio, in which the formed piece surrounds the measuring insert. Because of this measure, the formed piece can at least sectionally be introduced accurately fit into the protective tube. In this way, the thermal contact between the formed piece and the protective tube, or the measuring insert, as the case may be, is improved.

In another embodiment, the formed piece includes an endpiece, whose outer diameter is greater than an outer diameter of the formed piece in a middle region of the formed piece. Such an embodiment is especially advantageous for protective tubes with variable inner diameter, especially for such protective tubes, in the case of which the inner diameter of the protective tube in a first region, into which the temperature sensor is arrangeable, is less than in a second region far from the process. In such case, the endpiece is especially arranged in the second region and at least partially seals the first region from the environment.

In this regard, the endpiece is advantageously disc shaped. Depending on embodiment of the thermometer, it is further advantageous that the endpiece has a bore, through which the measuring insert is guidable.

It is, moreover, advantageous that a geometry of the endpiece at least partially corresponds to a geometry of the protective tube in a region, into which the formed piece is introducible. For a protective tube with first and second regions with different diameters, the geometry of the formed piece is especially fitted to the geometry of the protective tube in a transition between the first and second regions.

In an additional, especially preferred embodiment, the apparatus includes, moreover, securement means for an, especially releasable, securing of the formed piece in the protective tube and/or on the measuring insert. The securement means serves for improving the thermal contact between the formed piece and the protective tube and/or the formed piece and the measuring insert.

Advantageously, the securement means is embodied and arranged in such a manner that by means of the securement means an, especially predeterminable, compressive force is exertable on the formed piece. For providing the compressive force, or for exerting a predeterminable pressure on the formed part, the securement means can, for example, be embodied such that a spring force of the measuring insert itself is used.

In other embodiments, the securement means can comprise, for example, a spring, a screwed closure or a bayonet closure. As regards the securement means, basically all ways known to those skilled in the art for suitably securing the formed piece in the protective tube and/or on the measuring insert can be used and fall within the scope of the invention.

In a preferred embodiment, the securement means has at least one, especially cylindrical, basic body, which is arrangeable around the formed piece in the protective tube. The basic body can serve, for example, to transmit a predeterminable compressive force onto the formed piece.

Moreover, the basic body can in an embodiment of the invention be made of a heat insulating material. In such case, the basic body provides, furthermore, insulation from the environment. While the formed piece provides a uniform heat distribution in the vicinity of the temperature sensor, the basic body serves then as additional heat insulation from the environment.

The basic body is formed advantageously of a plastic, especially PEEK, PEK, or PPS.

In another embodiment, the basic body can, however, also be made of a heat conductive material. In such case, for example, a low thickness or an advantageous geometry can be selected for the basic body, in order also to achieve, in such case, a shielding of the formed piece from the environment.

Another embodiment includes that the securement means has at least one spring, by which the predeterminable compressive force is suppliable by means of the basic body. The spring surrounds the basic body at least in a section. The basic body is suitably embodied for supplying the force. For example, the basic body includes in an outer region a shoulder, on which the spring is arrangeable.

Finally another embodiment of the invention includes that the temperature sensor comprises at least one resistance element or thermocouple.

BRIEF DESCRIPTION OF THE DRAWINGS

The invention will now be explained in greater detail based on the appended drawing. The figures of the drawing show as follows:

FIG. 3 shows a first embodiment for a thermometer of the present disclosure for noninvasive temperature determination with a formed piece of the present disclosure;

FIG. 4 shows by way of example, embodiments for a formed piece of the present disclosure;

FIG. 5 shows a second embodiment for a thermometer of the present disclosure for invasive temperature determination with a formed piece of the present disclosure; and FIG. 6 shows a formed piece of the present disclosure with an embodiment of the securement means.

Figure 1:
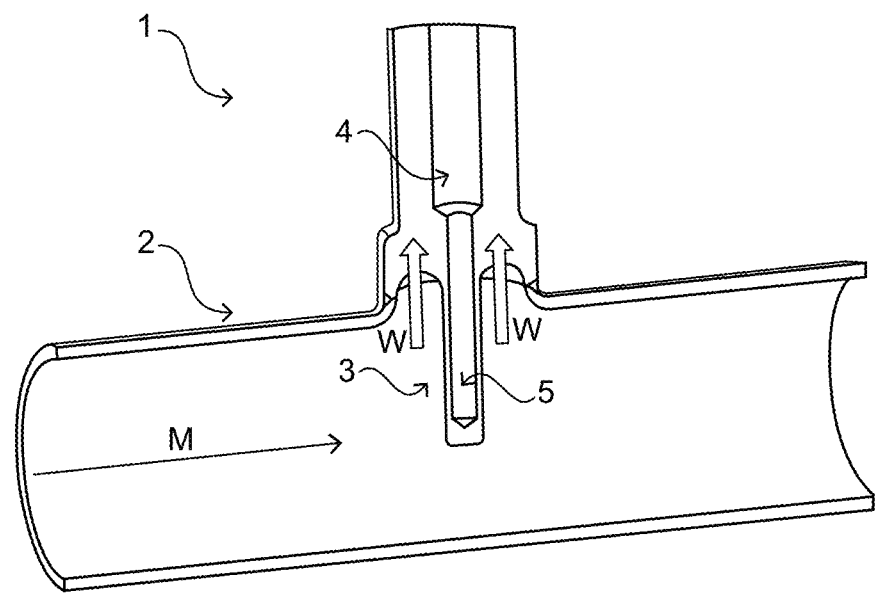
FIG. 1 shows a thermometer for invasive temperature measurement having a protective tube according to the state of the art.

In the figures, equal elements are provided with equal reference characters.

DETAILED DESCRIPTION

Shown in FIG. 1 is a schematic view of a thermometer 1 according to the state of the art for registering the temperature T of a pipeline 2 flowed through by a medium M. Thermometer 1 is introduced into the pipeline 2 by means of a protective tube 3. The temperature sensor 5 is part of a measuring insert 4, which is introducible releasably into the protective tube 3. In the case of an assembly of this type, the achievable accuracy of measurement depends, among other things, on the heat drain W to the environment of the process. The undesired heat drain grows with sinking penetration depth of the protective tube 3 into the pipeline 2, such that precisely for pipelines 2 of small diameter an increased measurement error is to be reckoned with.

Figure 2:
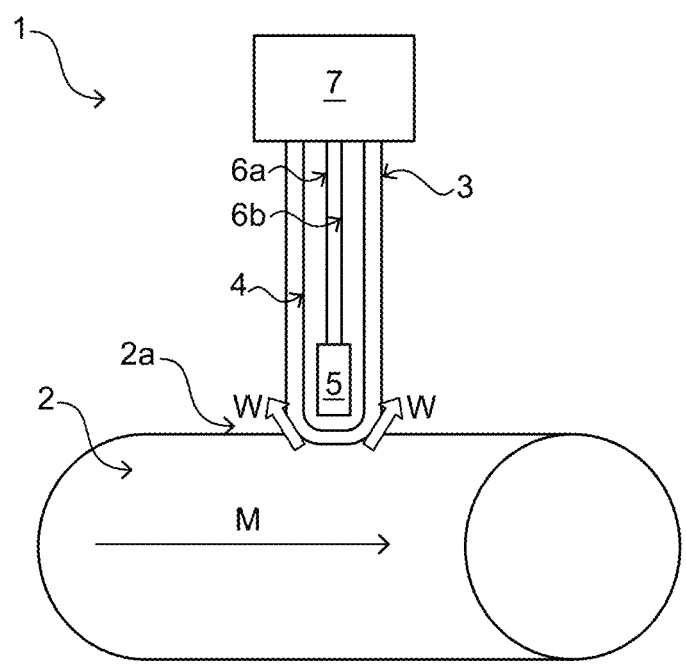
FIG. 2 shows a thermometer for noninvasive temperature measurement according to the state of the art.

A comparable problem results also for the case of a noninvasive temperature determination, such as shown in FIG. 2. In this case, the thermometer 1 does not protrude into the pipeline 2, but, instead, rests externally on a wall 2a of the pipeline 2. Also in such case, the measuring insert 3 includes a temperature sensor 5. Shown for the thermometer 1 of FIG. 2 are, furthermore, connection lines 6a, 6b, by means of which the temperature sensor 5 is connectable with an electronics 7. While the shown thermometer 1 is embodied with compact construction with integrated electronics 7, in the case of other thermometers 1 the electronics 7 can also be arranged separately from the measuring insert 3. The temperature sensor 5 can comprise, for example, a resistance element or a thermocouple and, depending on embodiment of the temperature sensor 5, the number of used connection lines 6 can vary. Also in such case, an undesired heat drain W to the environment takes place, which degrades the accuracy of measurement of the thermometer 1.

In order to reduce the negative influence of the heat drain, a thermometer of the invention includes a formed piece 8, which is arranged in the protective tube 3 and at least sectionally surrounds the measuring insert 4. Formed piece 8 is, thus, arranged at least partially between the measuring insert 4 and the protective tube 3.

A first embodiment of an apparatus 1 of the invention with a formed piece of the invention is shown in FIG. 3. The apparatus is a noninvasive thermometer 1 similar to the thermometer 1 of FIG. 2. Formed piece 8 for this embodiment is pot shaped. In a section, which for the embodiment shown here is arranged in the region of a floor F of the formed piece 8, the formed piece 8 is arranged between the measuring insert 4 and a floor of the protective tube 3, and the wall 2a of the container.

The formed piece 3 serves to provide a, preferably uniform, heating of a volume V surrounding the temperature sensor 5 and for preventing undesired temperature gradients in the region of the temperature sensor 5 due to heat loss to the environment.

Shown in FIG. 4 are three possible preferred embodiments for a formed piece 8 of the invention, which all and likewise the formed piece shown in FIG. 3, can be applied both for an invasive as well as also for a noninvasive thermometer. Formed piece 8 of FIG. 4a is tube or pipe shaped. The shown variant has a circularly round, cross sectional area; however, also other cross sectional areas are possible and fall within the scope of the invention. Formed piece 8 can in an additional embodiment not separately shown, however, similar to that shown in FIG. 3, furthermore, have a floor F. Furthermore, arranged in this floor F can be a bore, through which the measuring insert is guidable. The bore has then a diameter, especially a diameter fitting the diameter of the measuring insert 4 and less than an outer diameter of the formed piece 8. The outer diameter of the formed piece 8 is, in turn, fitted, for example, at least in the tubular section to an inner diameter of the protective tube 3. In an end region E, the geometry of the formed piece 8 can, furthermore, be fitted to the geometry of the measuring insert 4 and/or of the protective tube 3.

Another embodiment for a formed piece 8 of the invention is show in FIG. 4b. In such case, the formed piece 8 likewise includes a cylindrical section. Moreover, the formed piece 8 has an endpiece 9, whose outer diameter $d_9$ is greater than an outer diameter ds of a middle region of the formed piece 8. Endpiece 9 is disc shaped in the illustrated embodiment. In such case, endpiece 9 further includes an optional bore, as a result of which measuring insert 3 is guidable. Also the formed piece 8 shown in FIG. 4c includes a tubular section and an endpiece 9. Endpiece 9 is, however, adapted to the geometry of the protective tube 3, or embodied corresponding to such geometry, in contrast to FIG. 4b.

Another example of an embodiment of an apparatus 1 of the invention is shown in FIG. 5. Involved in such case is a thermometer 1 for invasive temperature determination, similarly to the thermometer 1 of FIG. 1. Thermometer 1 includes a formed piece 8 embodied analogously to the formed piece 8 of FIG. 4c. Formed piece 8 is arranged in the protective tube 3 and sectionally surrounds the measuring insert 4. Protective tube 3 has a variable inner diameter. In a first region $B_1$, it has a smaller inner diameter than in a second region $B_2$. Endpiece 9 of the formed piece 8 is arranged in a transition between the first region B1 and the second region B2 of the protective tube 3 and arranged corresponding to the geometry of the protective tube in the transition region. Endpiece 9 has therewith virtually the function of a lid, which seals the volume V surrounding the temperature sensor 5 from the environment. The formed piece 8 serves to conduct heat, which flows via the protective tube 3 to the environment, to the temperature sensor 5. In this way, a uniform temperature distribution around the temperature sensor 5 can be assured and an undesired heat drain W to the environment of the process prevented.

In order to assure a best possible thermal contact between the formed piece 9 and the protective tube 3, and measuring insert 4, the apparatus 1 of FIG. 5 includes supplementally, optionally, securement means 10. It is to be noted here that all embodiments shown here for thermometer 1 of the invention can optionally utilize suitable securement means 10 and according to the invention all securement means 10 known to those skilled in the art are possible.

The securement means of FIG. 5 comprises a cylindrical basic body 11, which is arranged at least sectionally around the formed piece 8 in the protective tube 3, and a spring 12 to exert a predeterminable compressive force on the formed piece. For transmitting the compressive force of the spring 12, the basic body 11 includes a shoulder 13, on which the spring 12 is arranged.

A more detailed view of such arrangement is shown in FIG. 6. In the view shown in FIG. 5, basic body 11 serves, furthermore, for thermal insulation of the formed piece 8 from the environment. For this, the basic body 11 is made, by way of example, of a heat insulating material and is so arranged that it surrounds the cylindrical section of the formed piece.

The invention claimed is:

1. An apparatus for determining or monitoring a temperature of a medium in a containment, comprising:
   a measuring insert having a temperature sensor for registering temperature, and including a process-far region arranged to be positioned further from the medium in the containment, and a distal region adjoining the process-far region and including a distal insert tip arranged to be positioned closer to the medium in the containment;
   a protective tube, in which the temperature sensor is arranged, including a closed distal tube tip forming a distally outermost extremity of the apparatus;
   a heat conductive one-piece formed piece, which is arranged in the protective tube and surrounds the measuring insert in at most a section of the measuring insert which section includes the process-far region of the measuring insert;

wherein the formed piece includes a tubular section defining an axis and arranged around the process-far region of the measuring insert, and such that the tubular section extends between the measuring insert and the protective tube; and a securement component for releasable securing of the formed piece in the protective tube and on the measuring insert, wherein the securement component has at least one basic body, and wherein the securement component is made of a heat insulating material and the formed piece is positioned at least partially in the securement component and contacted by the securement component in such a way that a compressive force on the at least one basic body in an axial direction is transmitted to the formed piece.

2. The apparatus as claimed in claim 1, wherein the formed piece is made of copper, silver, graphite, boron nitride, a steel, or an alloy containing at least one of these materials.

3. The apparatus as claimed in claim 1, wherein the formed piece is at least sectionally cylindrical.

4. The apparatus as claimed in claim 1, wherein the formed piece has at least sectionally a geometry corresponding to a geometry of the protective tube or the measuring insert.

5. The apparatus as claimed in claim 1, wherein the at least one basic body includes a basic body is formed of a plastic.

6. The apparatus as claimed in claim 1, wherein the at least one basic body serves for transmitting a predeterminable compressive force onto the formed piece, and wherein the securement component has at least one spring by which the predeterminable compressive force is suppliable using the basic body.

7. The apparatus as claimed in claim 1, wherein the temperature sensor comprises at least one resistance element or thermocouple.

8. The apparatus as claimed in claim 1, wherein the at least one basic body is cylindrical.

9. The apparatus as claimed in claim 1, wherein the formed piece is pot shaped.

10. The apparatus as claimed in claim 9, wherein a floor of the formed piece has a bore, along which the measuring insert is guidable.

11. The apparatus as claimed in claim 1, wherein the formed piece includes an endpiece whose outer diameter is greater than an outer diameter of the formed piece in a middle region of the formed piece, and the securement component abuts the endpiece.

12. The apparatus as claimed in claim 11, wherein the endpiece is disc shaped.

13. The apparatus as claimed in claim 11, wherein a geometry of the endpiece at least partially corresponds to a geometry of the protective tube in a region into which the formed piece is introducible.

14. An apparatus for determining or monitoring a temperature of a medium in a containment, comprising:

a measuring insert having a temperature sensor for registering temperature, and including a process-far region arranged to be positioned further from the medium in the containment, and a distal region adjoining the process-far region and including a distal insert tip arranged to be positioned closer to the medium in the containment;

a protective tube, in which the temperature sensor is arranged, including a closed distal tube tip forming a distally outermost extremity of the apparatus;

a heat conductive formed piece, which is arranged in the protective tube and surrounds the measuring insert in at most a section of the measuring insert which section includes the process-far region of the measuring insert;

wherein the formed piece includes a tubular section arranged around the process-far region of the measuring insert, and includes an endpiece enlarged in diameter relative to the tubular section; and a securement component for releasable securing of the formed piece in the protective tube and on the measuring insert, wherein the securement component is made of a heat insulating material and includes a distal component tip abutting the endpiece so as to as transmit a compressive force from the securement component to the formed piece.

* * * * *